US006276940B1

(12) United States Patent
White

(10) Patent No.: US 6,276,940 B1
(45) Date of Patent: Aug. 21, 2001

(54) CARD GAME FOR LEARNING THE ALPHABET

(76) Inventor: Charles L. White, P.O. Box 7059, Laramie, WY (US) 82073

( * ) Notice: Subject to any disclaimer, the term of this patent is extended or adjusted under 35 U.S.C. 154(b) by 0 days.

(21) Appl. No.: 09/589,145

(22) Filed: Jun. 7, 2000

(51) Int. Cl.[7] .............................. A63F 1/00; G09B 1/16
(52) U.S. Cl. .......................... 434/172; 273/299; 273/302
(58) Field of Search .................................. 273/296, 299, 273/302, 306, 308; 434/159, 171, 172

(56) References Cited

U.S. PATENT DOCUMENTS

| 4,192,513 |   | 3/1980 | Feeley et al. | 273/294 |
|---|---|---|---|---|
| 4,428,582 | * | 1/1984 | Smith | 273/296 |
| 4,826,175 |   | 5/1989 | Quatrino | 273/299 |
| 4,923,199 | * | 5/1990 | Hahn | 273/299 |
| 5,014,996 | * | 5/1991 | Von Braunhut | 273/299 |
| 5,199,714 | * | 4/1993 | Harper | 273/299 |
| 5,277,586 | * | 1/1994 | Branch | 434/184 |
| 5,409,237 | * | 4/1995 | Marcley | 273/299 |
| 5,417,432 |   | 5/1995 | Dwyer | 273/299 |
| 5,524,899 |   | 6/1996 | Haqedorn | 273/299 |
| 5,727,788 | * | 3/1998 | Davis | 273/303 |
| 5,772,212 |   | 6/1998 | Hagedorn | 273/299 |
| 5,863,043 |   | 1/1999 | Bitner | 273/299 |
| 5,906,492 | * | 5/1999 | Putterman | 434/169 |
| 6,099,318 | * | 8/2000 | McLeod | 434/129 |

* cited by examiner

Primary Examiner—Jacob K. Ackun, Jr.
Assistant Examiner—Kurt Fernstrom
(74) Attorney, Agent, or Firm—William E. Hein

(57) ABSTRACT

An card game for teaching children the alphabet utilizes a deck of one hundred eighteen cards, each card being associated with a single letter of the alphabet that is displayed on one side of the card, the frequency of cards containing each letter being roughly the same as the frequency with which each letter occurs in the English language, there being more cards containing letters which are more frequently used and less cards containing letters which are less frequently used. A desired graphic design may be placed on the reverse side of each card. Scoring involves only simple addition, which is educational in itself. Points are earned by players as they form sets, runs, and words with the cards initially dealt to them or subsequently drawn from a draw pile or discard pile and held in a hand. Bonus words can be specified at the beginning of play to provide additional scoring incentive.

13 Claims, 1 Drawing Sheet

CARD GAME FOR LEARNING THE ALPHABET

BACKGROUND AND SUMMARY OF THE INVENTION

This invention relates generally to card games and, more particularly, to an educational card game that helps children learn the alphabet at an early age.

Children who have gained familiarity with the alphabet prior to beginning their formal education have a distinct advantage over those who have not. Prior art letter games designed to be educational are not at the same time fun, since they are generally either difficult or too boring to capture the attention of children at an age that would benefit them in early stage letter and word learning. Many letter games involve boards, numbers, and pictures or other such pieces that distract from the intended teaching purpose of the game. These games typically involve very complex rules that discourage children before they even begin play.

Several instructional card games for teaching children the alphabet are known in the prior art. Exemplary of such card games are those described in U.S. Pat. Nos. 5,524,899 and 5,772,212 to Haqedorn, in which a deck of 52 cards is apportioned equally into two suit decks of 26 cards each, all letters of the alphabet appearing once in each suit, along with a graphical cue to assist the player in identifying that letter. Another such game is described in U.S. Pat. No. 5,417,432 to Dwyer, which employs two decks of 26 alphabet cards each, together with four wild cards, for a total of 56 cards that are used to play a word spelling game. Yet another such game is described in U.S. Pat. No. 5,863,043 to Bitner, which employs a deck of 104 cards used to play games in which "sets" or "runs" of alphabetic characters are the objects thereof. Another such game is described in U.S. Pat. No. 4,923,199 to Hahn, which employs a deck of 60 cards used to play a word forming game. Another such game is described in U.S. Pat. No. 4,826,175 to Quatrino, which employs three color groups of 43 cards each used to form words. Finally, U.S. Pat. No. 4,192,513 to Freeley et al. describes the use of four suits of 26 diamond-shaped cards each that are used for playing word games as well as conventional card games.

The card game of the present invention is advantageous in that it can be played and enjoyed by both children and adults, regardless of differences in age and learning ability. Moreover, it is simple enough to generate interest in children at an early age, yet challenging enough at its higher levels of play so as to maintain interest in older children.

In accordance with one embodiment of the present invention, a deck of cards consists of one hundred eighteen cards, each card being associated with a single letter of the alphabet that is displayed on the face side of the card. A desired graphic design serves to decorate the reverse side of each card. Varying numbers of the cards are associated with the different letters of the alphabet. Scoring involves only simple addition, which is educational in itself. Scoring points are earned by players as they form sets, runs, and words with the cards. Bonus words can be specified at the beginning of play to provide additional scoring incentive.

DETAILED DESCRIPTION OF THE PREFERRED EMBODIMENT

Figure 1:
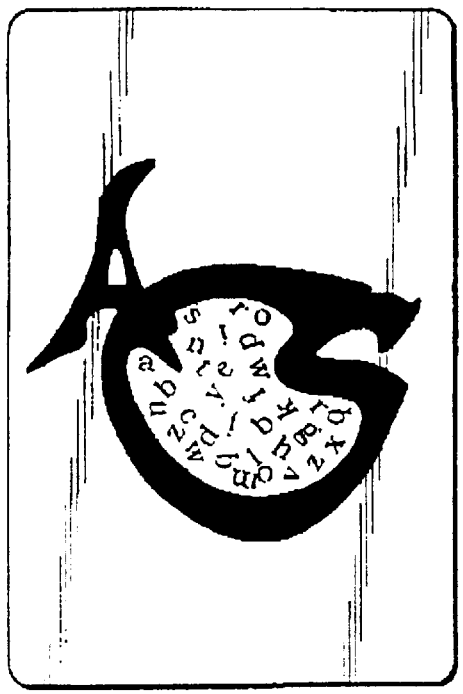
FIG. 1 is an illustration of the reverse side of each of the cards employed in the game of the present invention, showing a decorative graphic design thereon.

Referring now to FIG. 1, there is shown the reverse side of each of the cards in the deck of cards employed in the present invention, showing a decorative graphic design thereon.

Figure 2:
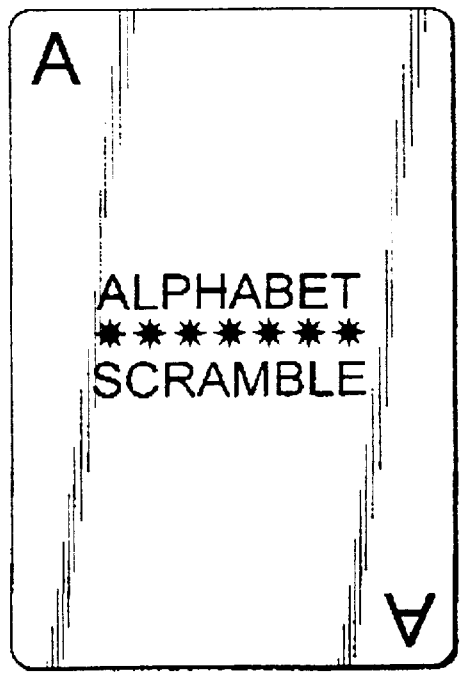
FIG. 2 is an illustration of the face side of those cards employed in the game of the present invention which are associated with the first letter of the alphabet.

Referring now to FIG. 2, there is shown the face side of a representative one of the cards employed in the game of the present invention, each of which is associated with a particular letter of the alphabet. Each of the cards has a face side like that illustrated in FIG. 2, except as to the particular letter of the alphabet represented. The deck of cards employed in the present game includes one hundred eighteen cards, several of which are associated with the same letter of the alphabet, as indicated by the following:

seven cards are associated with the letter "A";
three cards are associated with the letter "B";
four cards are associated with the letter "C";
six cards are associated with the letter "D";
seven cards are associated with the letter "E";
four cards are associated with the letter "F";
five cards are associated with the letter "G";
four cards are associated with the letter "H";
seven cards are associated with the letter "I";
three cards are associated with the letter "J";
three cards are associated with the letter "K";
four cards are associated with the letter "L";
six cards are associated with the letter "M";
six cards are associated with the letter "N";
seven cards are associated with the letter "O";
four cards are associated with the letter "P";
three cards are associated with the letter "Q";
six cards are associated with the letter "R";
four cards are associated with the letter "S";
six cards are associated with the letter "T";
four cards are associated with the letter "U";
three cards are associated with the letter "V";
four cards are associated with the letter "W";
two cards are associated with the letter "X";
four cards are associated with the letter "Y"; and
two cards are associated with the letter "Z".

The game of the present invention involves the usual shuffling of the deck and playing in turn, with the player to the left of the dealer taking the first turn, the player on his left taking the next turn, and so on. To begin the game, each player is dealt seven cards, with the balance of the deck being placed face down in the center of the playing table to form a draw pile, following which the top card is turned face up and placed beside the draw pile to begin a discard pile. Next, each player in turn draws a single card from either the draw pile or the discard pile. A card drawn from the discard pile must be used at that time to form and lay down a SET, RUN or WORD, after which the player discards a card from his hand. A SET consists of three or more cards representing the same letter; a RUN consists of three or more cards representing consecutive letters; and a WORD consists of three or more cards representing letters that form a dictionary word. If a player can use a card from the discard pile that is located below the top card in the discard pile, he or she must take all cards on top of the desired card, use the desired card to lay down a SET, RUN or WORD, and then discard. For example, if the discard pile contains the five cards ADJLP from bottom to top, and the player wants the J card, he or she must take the top three cards J, L, and P, use at least the J card to form and lay down a SET, RUN or WORD, put the unused cards in his hand, and then discard to finish that turn. Each player must draw from either the draw pile or the discard pile before laying down a SET, RUN or WORD. A player's turn ends when he or she discards.

In order to win a hand, a player must have laid down all cards in his or her hand, with one card remaining to discard. That player's score is calculated by according five points to each card laid down, except that WORDS containing five or more cards are accorded an additional ten points. The first player to accumulate 300 points is the game winner. Cards remaining in the other player's hands when a hand is won are subtracted from the their scores at the rate of five points per card remaining. In case of a tie at the end of a game, those players having the same number of points play one more hand.

Several variations of the above-described basic game are possible, such as specifying that for each hand played, a player must be able to lay down a different combination of SETS, RUNS or WORDS. For example, it could be decided that in the first hand each player must lay down a minimum of one SET, one RUN, and one WORD, that in the second hand each player must lay down a minimum of two SETS and one RUN, and that in the third hand each player must lay down a minimum of two RUNS and one WORD. Alternatively, it may be specified that all of the hands in an entire game of 300 points are played with one of the above combinations or with any other combination of SETS, RUNS or WORDS, including all SETS, all RUNS or all WORDS. In another variation of the basic game, it may be specified that a player may play on SETS, RUNS or WORDS which have been laid down by another player. For example, if one player has laid down a SET of three cards representing the letter "A", another player could lay down a fourth card representing the letter "A" and add five points to his score. In yet another variation of the basic game, the dealer may, at the beginning of a game, choose a bonus word which, if laid down by a player during the game, is worth an additional twenty-five points to that player. For example, the dealer could pick the word ROBOT as a bonus word. In a further variation of the basic game, it could be specified that SETS containing all vowels could be laid down for an additional five points per vowel. For example, a player who lays down the vowel set AEI would receive five points per card plus an additional five points per card because they are all vowels, for a total of thirty points. In a final variation of the basic game, it could be specified that noun WORDS laid down are worth an additional ten points. For example, if a player were to lay down cards representing the word CAR, he or she would be accorded fifteen points for the three cards plus an additional ten points because the WORD laid down is a noun.

I claim:

1. A deck of playing cards for playing an alphabet learning game, the deck comprising one hundred eighteen cards, a front face of each of the cards containing indicia representative of a single letter of the alphabet, the frequency of cards containing each letter being as follows:
   seven cards representative of each of the letters A, E, I, and O;
   six cards representative of each of the letters D, M, N, R, and T;
   five cards representative of the letter G;
   four cards representative of each of the letters C, F, H, L, P, S, U, W, and Y;
   three cards representative of each of the letters B, J, K, Q, and V; and
   two cards representative of each of the letters X and Z.

2. A deck of playing cards as in claim 1, wherein a rear face of each of the cards contains a like graphic design.

3. An alphabet card game comprising the following steps:
   providing a deck of playing cards consisting of a predetermined number of cards, each card having a front face containing indicia representative of a single letter of the alphabets;
   dealing each player a hand consisting of a predetermined number of playing cards;
   placing the remaining un-dealt cards upside down in a draw pile;
   turning the top card of the draw pile face up to begin a discard pile;
   moving from player to player, beginning with the player to the left of dealer, each player taking a turn which further comprises the steps of:
   drawing a card from the draw pile or the discard pile;
   forming, when possible, one or more of a SET, RUN, and WORD, from the cards in the player's hand, a SET consisting of at least three cards representing the same letter, a RUN consisting of at least three cards representing consecutive letters, and a WORD consisting of at least three cards representing a dictionary word;
   laying down the one or more SETS, RUNS, and WORDS so formed;
   discarding a card face up on the discard pile;
   continuing play until one player, who becomes the winner of that hand, has no cards remaining in his hand;
   scoring that hand by according each player a fixed number of points for each card laid down and, in the case of the non-winner players, by subtracting from the points so accorded, the same fixed number of points for each card remaining in their hands;
   continuing dealing and playing hands in accordance with the foregoing steps until one player reaches a predetermined accumulated number of points, that player being declared the winner of the game.

4. An alphabet card game as in claim 3, wherein the predetermined number of cards comprising said deck is one hundred eighteen cards.

5. An alphabet card game as in claim 3, wherein the predetermined number of cards dealt to each player is seven.

6. An alphabet card game as in claim 3, wherein the fixed number of points accorded each player for each card laid down is five.

7. An alphabet card game as in claim 3, wherein the predetermined accumulated number of points by which a game is won is three hundred points.

8. An alphabet card game as in claim 3, wherein the step of scoring further comprises according a bonus of ten points to each player for each WORD laid down that consists of five or more cards.

9. An alphabet card game as in claim 3, wherein a player drawing a card from the discard pile must lay down that card, during that turn, as part of one or more SETS, RUNS, and WORDS so formed.

10. An alphabet card game as in claim 3, wherein a player drawing a desired card from the discard pile that is not the top card in the discard pile must take the desired card and all cards on top thereof and must lay down the desired card, during that turn, as part of one or more SETS, RUNS, and WORDS so formed.

11. An alphabet card game as in claim 3, further comprising the step of specifying a bonus word prior to the step of dealing and wherein, the step of scoring further comprises according a number of bonus points to each player who lays down a WORD that is the bonus word.

12. An alphabet card game as in claim 11, wherein said number of bonus points accorded each player who lays down a WORD that is the bonus word is twenty-five points.

13. An alphabet card game comprising the following steps:

providing a deck of one hundred eighteen playing cards, each card having a front face containing indicia representative of a single letter of the alphabet, the frequency of cards containing each letter being as follows: seven cards representative of each of the letters A, E, I, and O; six cards representative of each of the letters D, M, N, R, and T; five cards representative of the letter G; four cards representative of each of the letters C, F, H, L, P, S, U, W, and Y; three cards representative of each of the letters B, J, K, Q, and V; and two cards representative of each of the letters X and Z;

dealing each player a hand consisting of a predetermined number of playing cards;

placing the remaining un-dealt cards upside down in a draw pile;

turning the top card of the draw pile face up to begin a discard pile;

moving from player to player, beginning with the player to the left of dealer, each player taking a turn which further comprises the steps of:

drawing a card from the draw pile or the discard pile;

forming, when possible, one or more of a SET, RUN, and WORD, from the cards in the player's hand, a SET consisting of at least three cards representing the same letter, a RUN consisting of at least three cards representing consecutive letters, and a WORD consisting of at least three cards representing a dictionary word;

laying down the one or more SETS, RUNS, and WORDS so formed;

discarding a card face up on the discard pile;

continuing play until one player, who becomes the winner of that hand, has no cards remaining in his hand;

scoring that hand by according each player a fixed number of points for each card laid down and, in the case of the non-winner players, by subtracting from the points so accorded, the same fixed number of points for each card remaining in their hands;

continuing dealing and playing hands in accordance with the foregoing steps until one player reaches a predetermined accumulated number of points, that player being declared the winner of the game.

\* \* \* \* \*